US012663775B2

(12) United States Patent (10) Patent No.: US 12,663,775 B2
Takenaka et al. (45) Date of Patent: Jun. 23, 2026

(54) MOTOR DRIVER AND SERVO DRIVE SYSTEM

(71) Applicant: Mitsubishi Electric Corporation, Tokyo (JP)

(72) Inventors: Ayane Takenaka, Tokyo (JP); Masataka Ieda, Tokyo (JP); Yuma Hayashi, Tokyo (JP); Yoshinori Aoki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/724,631

(22) PCT Filed: Apr. 8, 2022

(86) PCT No.: PCT/JP2022/017426
§ 371 (c)(1),
(2) Date: Jun. 27, 2024

(87) PCT Pub. No.: WO2023/195178
PCT Pub. Date: Oct. 12, 2023

(65) Prior Publication Data
US 2024/0419143 A1     Dec. 19, 2024

(51) Int. Cl.
G05B 19/042          (2006.01)
(52) U.S. Cl.
CPC .................... G05B 19/0426 (2013.01); G05B 2219/23416 (2013.01)
(58) Field of Classification Search
CPC ................. G05B 19/0426; G05B 2219/23416
See application file for complete search history.

(56) References Cited

U.S. PATENT DOCUMENTS 7,151,352 B2     12/2006   Ohashi et al.
11,518,435 B2 *  12/2022   Taki .......................... H02P 5/60
(Continued)

FOREIGN PATENT DOCUMENTS

CN        103019169 A       4/2013
CN        113632017 A       11/2021
(Continued)

OTHER PUBLICATIONS

International Search Report and Written Opinion mailed on Jun. 28, 2022, received for PCT Application PCT/JP2022/017426, filed on Apr. 8, 2022, 9 pages including English Translation.
(Continued)

*Primary Examiner* — Mark A Connolly
*Assistant Examiner* — Tyler Dean Hedrick
(74) *Attorney, Agent, or Firm* — XSENSUS LLP

(57)               ABSTRACT

A motor driver that supplies electrical power to a motor on a basis of a control command sent with a network communication period from a higher-level controller includes a network frame receiver that receives the control command, a user program processor that performs program processing of a user program generated by a user, a servo controller that outputs a servo control command based on the control command, and a drive controller the supplies electrical power based on the servo control command to the motor. When the user program processor performs the program processing, the user program processor starts the user program according to an activation signal generated at reception of the control command to cause the user program to perform the program processing on the control command in synchronization with timing when the network frame receiver receives the control command, and the servo controller outputs the servo control command.

13 Claims, 7 Drawing Sheets

(56) References Cited

U.S. PATENT DOCUMENTS

| | | | | |
|---|---|---|---|---|
| 2018/0208404 | A1* | 7/2018 | Kumagai | B65G 43/10 |
| 2019/0258229 | A1* | 8/2019 | Oho | G05B 19/4155 |
| 2020/0104094 | A1* | 4/2020 | White | G10L 17/00 |
| 2021/0011498 | A1* | 1/2021 | Tajima | G01D 5/24471 |
| 2022/0269238 | A1* | 8/2022 | Sekimoto | G05B 19/41815 |

FOREIGN PATENT DOCUMENTS

| | | | |
|---|---|---|---|
| DE | 112022005209 | T5 | 11/2024 |
| JP | 2005-234639 | A | 9/2005 |
| JP | 2006-230150 | A | 8/2006 |
| JP | 2013-073351 | A | 4/2013 |
| JP | 2017-094472 | A | 6/2017 |
| JP | 6331655 | B2 | 5/2018 |
| JP | 2019-106225 | A | 6/2019 |
| JP | 2021-114806 | A | 8/2021 |

OTHER PUBLICATIONS

Decision to Grant mailed on Jan. 17, 2023, received for JP Application No. 2022-561007, 3 pages including English Translation.
Office Action mailed on Apr. 7, 2025 for the corresponding German patent application No. 112022005203.1 with an English machine translation thereof.
Office Action mailed on Apr. 25, 2025 for the corresponding Chinese patent application No. 202280086067.4 and an English machine translation thereof.

\* cited by examiner

FIG.5

MOTOR DRIVER AND SERVO DRIVE SYSTEM

CROSS-REFERENCE TO RELATED APPLICATION

The present application is based on International Application No. PCT/JP2022/017426, filed Apr. 8, 2022, the entire contents of which are incorporated herein by reference.

FIELD

The present disclosure relates to a motor driver for driving a motor and to a servo drive system.

BACKGROUND

An industrial motor driver controls a servomotor by a servo controller based on a feedback value (i.e., an operation detection value such as a position feedback value, a speed feedback value, or a torque feedback value) from the servomotor to cause the servomotor to follow a control command (e.g., a position command, a speed command, or a torque command) input from a higher-level controller. Such control provided by a motor driver is performed pursuant to system software embedded in an execution memory unit in the motor driver.

In this motor driver, to convert, for example, a sequential position command sent from a higher-level controller into a position command for a user-specific device such as an electronic cam, and to output the position command, modification needs to be made on the position command output by the servo controller. Thus, even when a servo control command output by the servo controller needs to be modified by adding user-specific processing, such modification is not feasible in usual system software. To enable the motor driver to perform user-specific processing, the user needs to request the manufacturer of the motor driver to modify the system software each time such situation occurs. In addition, severe restrictions imposed on industrial motor drivers prevents the user from specially making a modification when functionality of the system software has been partly modified.

A method of customization has thus been suggested that allows the user to specially modify part of such system software. The motor driver described in Patent Literature 1 has a user function selection parameter for activating, instead of processing of the system software, a user function generated by the user in units of functions of functionality provided by the system software. The motor driver described in Patent Literature 1 then determines whether the user function is valid, and performs the user function instead of processing of the system software when the user function is valid.

CITATION LIST

Patent Literature

Patent Literature 1: Japanese Patent Application Laid-open No. 2005-234639

SUMMARY OF INVENTION

Problem to be Solved by the Invention

However, the foregoing technology of Patent Literature 1 has a problem of incapability of performing program processing of the user program in synchronization with a control command sent from the higher-level controller.

The present disclosure has been made in view of the foregoing, and it is an object of the present disclosure to provide a motor driver capable of performing program processing of a user program in synchronization with a control command sent from a higher-level controller.

Means to Solve the Problem

To solve the problem and achieve the object described above, a motor driver of the present disclosure is a motor driver configured to supply electrical power to a motor on a basis of a control command sent with a network communication period from a higher-level controller connected to the motor driver via a network. The motor driver of the present disclosure incudes: a network frame receiver configured to receive the control command; and a user program processor configured to perform program processing of a user program created by a user. The motor driver of the present disclosure also includes: a servo controller configured to output a servo control command that bases on the control command; and a drive controller configured to supply electrical power, which bases on the servo control command, to the motor. When the user program processor performs the program processing: the user program processor starts the user program according to each of activation signals generated at respective receptions of the control command to cause the user program to perform the program processing on the control command in synchronization with timing when the network frame receiver receives the control command, and the servo controller is configured to output the servo control command, the servo control command being based on the control command resulting from the program processing.

Effects of the Invention

A motor driver according to the present disclosure provides an advantage in capability of performing program processing of a user program in synchronization with a control command sent from a higher-level controller.

BRIEF DESCRIPTION OF DRAWINGS

FIG. 5 is a diagram for describing functional configurations of a user program processor and of a servo controller included in the motor driver according to the embodiment.

DESCRIPTION OF EMBODIMENT

A motor driver and a servo drive system according to an embodiment of the present disclosure will be described in detail below with reference to the drawings.

Embodiment

Figure 1:
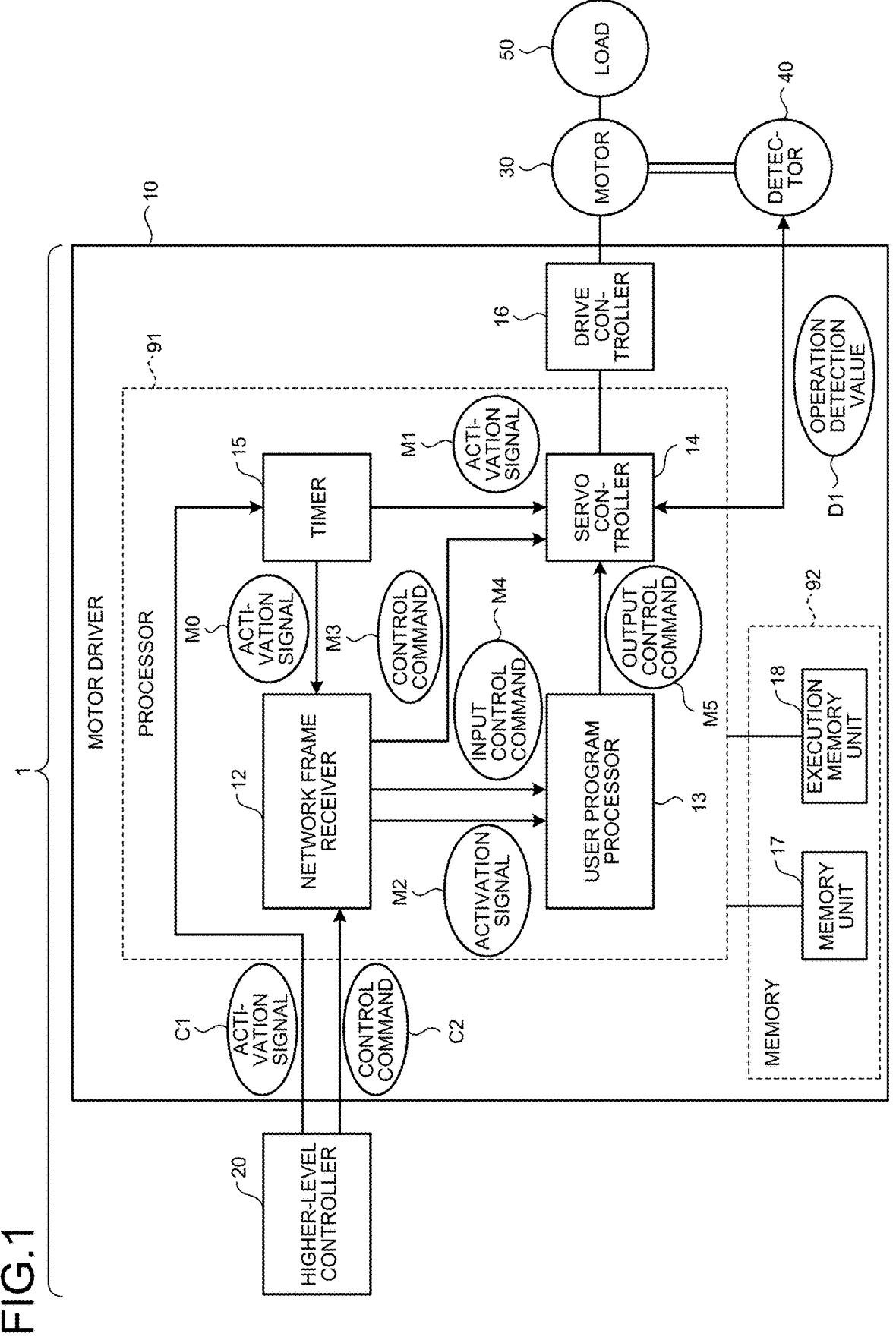
FIG. 1 is a diagram illustrating a configuration of a servo drive system including a motor driver according to an embodiment.

FIG. 1 is a diagram illustrating a configuration of a servo drive system including a motor driver according to an embodiment. A servo drive system 1 includes a motor driver 10 and a higher-level controller (motion controller) 20.

The higher-level controller 20 is connected to the motor driver 10 via a network through a communication line to allow network communication with the motor driver 10. In addition, the motor driver 10 is connected to a motor 30 and to a detector 40. The motor 30 is connected to a load 50. Note that the higher-level controller 20 may be connected to the motor driver 10 via a network by wireless communication without using a communication line.

The motor driver 10 drives the motor 30 on the basis of a control command C2 sent from the higher-level controller 20. The motor driver 10 allows installation therein of a user program written using a function or the like, and is capable of driving the motor 30 according to the user program. The motor driver 10 of the present embodiment starts the user program based on an activation signal M2, which is generated at each reception of the control command C2 from the higher-level controller 20, thereby performing user program processing in synchronization with a network communication period MC-Ti of network communication with the higher-level controller 20. The motor driver 10 thus performs user program processing in synchronization with the network communication period MC-Ti, and can thus perform user program processing at high speed.

The motor driver 10 user customizes the control command C2 sent from the higher-level controller 20 by the user program, by synchronizing the control command C2 sent from the higher-level controller 20 with program processing of a user program.

The motor driver 10 controls the motor 30 so as to follow the control command (e.g., a position command, a speed command, or a torque command) C2 periodically input, in accordance with the network communication period MC-Ti, from the higher-level controller 20.

The motor driver 10 causes the user program to perform processing of user customization of the control command C2 sent from the higher-level controller 20, in synchronization with timing of reception of the control command C2 from the higher-level controller 20. This causes the motor driver 10 to generate, by the user program, an output control command M5 associated with the control command C2. In a conventional technology, program processing performed by the user program is performed with a period ranging from several tens of milliseconds to several hundred of milliseconds. In the present embodiment, this program processing is high-speed processing performed with a period of, for example, 1 millisecond or shorter. The user program is, for example, a program written in C language.

The motor driver 10 includes a processor 91, a drive controller 16, and a memory 92. The processor 91 includes a network frame receiver 12, a timer 15, a user program processor 13, and a servo controller 14. The memory 92 includes a memory unit 17 and an execution memory unit 18.

The network frame receiver 12 and the timer 15 are connected to the higher-level controller 20. The servo controller 14 is connected to the drive controller 16 and to the detector 40. The drive controller 16 is connected to the motor 30. The memory unit 17 and the execution memory unit 18 are connected to the processor 91.

The higher-level controller 20 sends the control command C2 to the motor driver 10 every network communication period MC-Ti. This causes the network frame receiver 12 to receive the control command C2 at timing synchronized with the network communication period MC-Ti (where such timing is a network frame reception execution period NT-Ti described later). The control command C2 is a signal to control the motor 30 by the motor driver 10. In the motor driver 10, the processor 91 performs processing at a speed that is constant-value times the network communication period MC-Ti. For example, when the network communication period MC-Ti is 200 microseconds (µsec), the processor 91 performs processing with a 100-µsec period, a 200-µsec period, or a 400-µsec period. Note that the processing period in the network frame receiver 12, the processing period in the user program processor 13, and the processing period in the servo controller 14 may be different processing periods from each other or a same processing period. In addition, the processing periods in the processor 91 may be shorter than the network communication period MC-Ti.

The higher-level controller 20 also sends an activation signal C1 to the motor driver 10 every activation period MCN-Ti. This causes the timer 15 to receive the activation signal C1 every activation period MCN-Ti. The activation period MCN-Ti is, for example, a period that is constant-value times the network communication period MC-Ti. The activation signal C1 is a signal for providing communication (i.e., sending and receiving of the control command C2) between the higher-level controller 20 and the motor driver 10 at specific timing.

In the servo drive system 1, the higher-level controller 20 sends, and the motor driver 10 receives, the control command C2 with a predetermined period, on the basis of the activation signal C1.

The timer 15 generates an activation signal M0 to be output to the network frame receiver 12 and an activation signal M1 to be output to the servo controller 14, on the basis of the activation signal C1. Specifically, the timer 15 generates a counter value every period Ti on the basis of the activation signal C1 sent with the activation period MCN-Ti. That is, the timer 15 increments a counter value every period Ti on the basis of the activation period MCN-Ti, which is the receiving period of the activation signal C1 sent from the higher-level controller 20. The period Ti is constant-value times the activation period MCN-Ti.

The timer 15 outputs the counter value generated every period Ti to the network frame receiver 12 as the activation signal M0, and outputs the counter value generated every period Ti to the servo controller 14 as the activation signal M1. This causes the higher-level controller 20 and the motor driver 10 to synchronize with each other based on the counter value (1, 2, 3, . . . ) generated every period Ti by the timer 15.

As described above, the timer 15 synchronizes the counter value generated every period Ti by the timer 15 with the control command C2 at timing when the activation signal C1 is received with the activation period MCN-Ti. This enables the higher-level controller 20 and the motor driver 10 to synchronize with each other through network communication. In the servo drive system 1, it is sufficient that the higher-level controller 20 and the motor driver 10 can synchronize with each other through network communication, and the method of synchronization is arbitrary.

Note that the timer 15 may output the activation signals M0 and M1 to the network frame receiver 12 and to the servo controller 14 respectively every period Ti based on the network communication period MC-Ti. That is, the timer 15 may synchronize the counter value generated every period Ti with the control command C2 every network communication period MC-Ti. The period Ti in this case may be the same as the network communication period MC-Ti or constant-value times the network communication period MC-Ti.

The network frame receiver 12 is started every network frame reception execution period NT-Ti, in synchronization with the counter value (activation signal M0) output every period Ti from the timer 15. The network frame reception execution period NT-Ti is, for example, constant-value times the period Ti.

The network frame receiver 12 receives, every network frame reception execution period NT-Ti, the control command C2 including a sequential command such as a sequential position command, a sequential speed command, or a sequential torque command sent from the higher-level controller 20.

Here, the sequential position command, the sequential speed command, and the sequential torque command are each a command transmitted from the higher-level controller 20 to the motor driver 10. The sequential position command, the sequential speed command, and the sequential torque command are updated every network communication period MC-Ti.

The sequential position command is a command instructing every network communication period MC-Ti to which position the motor 30 is to be moved. A difference between an immediately previous reception value and a current reception value of the sequential position command is a speed command instructing at which speed the motor 30 is to be driven.

The sequential speed command is a command instructing every network communication period MC-Ti at which speed the motor 30 is to be operated. The sequential torque command is a command instructing every network communication period MC-Ti with which torque the motor 30 is to be operated.

The network frame receiver 12 generates the activation signal M2 every user program processing period ADD-Ti, which is a user-set process execution interval of the user program. The network frame receiver 12 then sends the activation signal M2 to the user program processor 13. Thus, the network frame receiver 12 causes the user program processor 13 to operate with a period of the user program processing period ADD-Ti. The user program processing period ADD-Ti is, for example, constant-value times the network communication period MC-Ti.

Note that the activation signal M2 is not limited to one generated by the network frame receiver 12 based on the activation signal M0. The processor 91 may generate the activation signal M2 corresponding to timing of reception of the control command C2 by any method. For example, it may be the timer 15 that generates the activation signal M2 corresponding to timing of reception of the control command C2, or the activation signal M2 corresponding to timing of reception of the control command C2 may be generated in a portion other than the timer 15. As such, the activation signal M2 may be any signal synchronized with reception of data from the higher-level controller 20, and there is no limitation on the source of generation of the activation signal M2.

The network frame receiver 12 sends control commands associated with the control command C2 received, to the user program processor 13 and to the servo controller 14. Specifically, the network frame receiver 12 sends a control command M3 associated with the control command C2 to the servo controller 14 and sends an input control command M4 associated with the control command C2 to the user program processor 13.

The control command M3 and the input control command M4 are commands generated by conversion from the control command C2 for use internally in the motor driver 10. The input control command M4 is a control command input to the user program processor 13, and the control command M3 is a control command input to the servo controller 14. The control command M3 and the input control command M4 include a same command content. The control command M3 is a control command for use when the user program will not be used, and the input control command M4 is a control command for use when the user program will be used.

The user program processor 13 performs program processing of the user program in synchronization with the activation signal M2 sent every user program processing period ADD-Ti from the network frame receiver 12. The user program processor 13 performs processing using the user program, on the input control command M4 received from the network frame receiver 12 to thereby customize the input control command M4 (control command C2).

The user program processor 13, for example, converts the input control command M4 into a command as specified by the user to thereby customize the input control command M4. The user program processor 13 outputs a result of customization of the input control command M4 to the servo controller 14 as the output control command M5.

The detector 40 detects a value such as the position of the motor 30 (rotational position, movement position, or the like), the speed of the motor 30 (rotational speed, moving speed, or the like), or the torque of the motor 30, and sends an operation detection value D1, which is the detected value, to the servo controller 14.

The motor driver 10 and the detector 40 exchange data on the basis of the operational period of the motor driver 10. That is, the motor driver 10 and the detector 40 exchange data based on operation of the timer 15, which defines the operational period of the motor driver 10. Specifically, the motor driver 10 and the detector 40 exchange data in synchronization with the period with which the motor driver 10 controls the motor 30. For example, the servo controller 14 receives the activation signal M1 every period Ti from the timer 15, and sends, to the detector 40, request data for requesting the operation detection value D1 at timing synchronized with the period Ti (where such timing is a servo control period SV-Ti described later). The detector 40 then sends a feedback value, which is the operation detection value D1 requested by the request data received from the servo controller 14. The servo controller 14 receives the feedback value, which is the operation detection value D1, sent from the detector 40. The motor driver 10 and the detector 40 exchange data in this manner in synchronization with the period with which the motor driver 10 controls the motor 30.

The feedback value that the servo controller 14 receives from the detector 40 includes a position feedback value, a speed feedback value, a torque feedback value, or the like of the motor 30.

The servo controller 14 is started every servo control period SV-Ti, in synchronization with the counter value (activation signal M1) output every period Ti from the timer 15. The servo control period SV-Ti is a period that is constant-value times the period Ti. The servo control period SV-Ti is the shortest period among the operational periods used by the motor driver 10. In other words, the servo controller 14 performs processing at a highest speed in the motor driver 10.

The servo controller 14 includes at least one of a position controller that controls the position of the motor 30, a speed controller that controls the speed of the motor 30, and a current controller that controls the current (torque) to the motor 30.

When the user program is not to be used, the servo controller 14 performs feedback control on the motor 30 based on the control command M3 associated with the control command C2 sent from the higher-level controller 20 and on the operation detection value D1 received from the detector 40. The control command M3 is a command generated by converting the control command C2 for use in the motor driver 10.

When the user program is to be used, the servo controller 14 performs feedback control on the motor 30 based on the output control command M5 associated with the control command C2 sent from the higher-level controller 20 and on the operation detection value D1 received from the detector 40. Thus, when the input control command M4 is customized by the user program processor 13, the servo controller 14 performs feedback control on the motor 30 using the output control command M5 generated by customization.

As described above, the servo controller 14 includes a position controller, a speed controller, or a current controller, and obtains the operation detection value D1 such as a position feedback value, a speed feedback value, or a torque feedback value of the motor 30. The servo controller 14 captures every servo control period SV-Ti the control command M3 or the output control command M5 each associated with the control command C2 such as a position command, a speed command, or a torque command, input from the higher-level controller 20. The servo controller 14 then performs feedback control on the motor 30 based on the operation detection value D1 so as to cause the motor 30 to follow the control command M3 or the output control command M5.

The servo controller 14 sends a servo control command including a position command, a speed command, or a current command to the drive controller 16. The drive controller 16 supplies electrical power to the motor 30 on the basis of the servo control command. The motor 30 drives the load 50.

Note that the servo controller 14 may have monitoring functionality to monitor: information from the detector 40 including the operation detection value D1; the control command C2 received from the higher-level controller 20; and the control command M3, the input control command M4, and the output control command M5 used inside the motor driver 10, and the like. In this case, the servo controller 14 may have alarm output functionality to output an alarm when an unusual condition inside the motor driver 10 is detected based on monitored information.

Here, a hardware configuration of the motor driver 10 will be described. The motor driver 10 can be implemented in the processor 91 and the memory 92. Each functionality of the motor driver 10 is implemented by using a computer system such as a personal computer or a general-purpose computer or using a factory automation (FA) device.

The motor driver 10 includes the processor 91, which executes various processing tasks, and the memory 92, which is a built-in memory. Examples of the processor 91 include a central processing unit (CPU) and a system large scale integration (LSI). The processor 91 may be a central processing unit, a processing unit, a computing unit, a microprocessor, a microcomputer, or a digital signal processor (DSP).

The memory 92 is a non-volatile or volatile semiconductor memory. The memory 92 is, for example, a random access memory (RAM), a read only memory (ROM), a flash memory, an erasable programmable read only memory (EPROM), or an electrically erasable programmable read only memory (EEPROM) (registered trademark). The execution memory unit 18 of the memory 92 is used as a temporary memory when the processor 91 executes various processing tasks.

Each functionality of the motor driver 10 is implemented in the processor 91 and software, firmware, or a combination of software and firmware. The software or firmware is written in the form of a program, and is stored in an external storage device (not illustrated). The processor 91 loads the software or firmware stored in the external storage device into the memory 92 to execute the software or firmware. That is, the motor driver 10 is implemented in such a manner that the processor 91 reads and executes computer-executable motor drive program and user program, stored in the memory 92, for performing operation of the motor driver 10. It can also be said that the motor drive program and the user program for performing operation of the motor driver 10 are programs that cause a computer or an FA device to execute a procedure or method to be performed by the motor driver 10.

The motor drive program executed in the motor driver 10 has a modular structure including the network frame receiver 12, the timer 15, the user program processor 13, and the servo controller 14. These modules are loaded into the main storage device, and these modules are generated in the main storage device.

The motor drive program and the user program may be stored in a computer-readable storage medium as files in an installable or executable format, and provided as a computer program product. Alternatively, the motor drive program and the user program may be provided to the motor driver 10 via a network such as the Internet. Note that the functionality of the motor driver 10 may be implemented partially in a dedicated hardware element such as a dedicated circuit and partially in software or firmware. The drive controller 16 is implemented, for example, in a dedicated circuit.

Here, transfer operation of the activation signals M0, M1, and M2 in the motor driver 10 will be described. For example, when the activation signals M0, M1, and M2 are transferred using an electrical signal, the activation signals M0, M1, and M2 may be output by a function call by software or the like, or output by a pulse signal by a dedicated circuit. Note that the activation signals M0, M1, and M2 may be transferred using any method.

For example, the activation signal M0 is a signal for calling a function of processing to be performed by the network frame receiver 12; the activation signal M1 is a signal for calling a function of processing to be performed by the servo controller 14; and the activation signal M2 is a signal for calling a function of processing to be performed by the user program processor 13.

Figure 2:
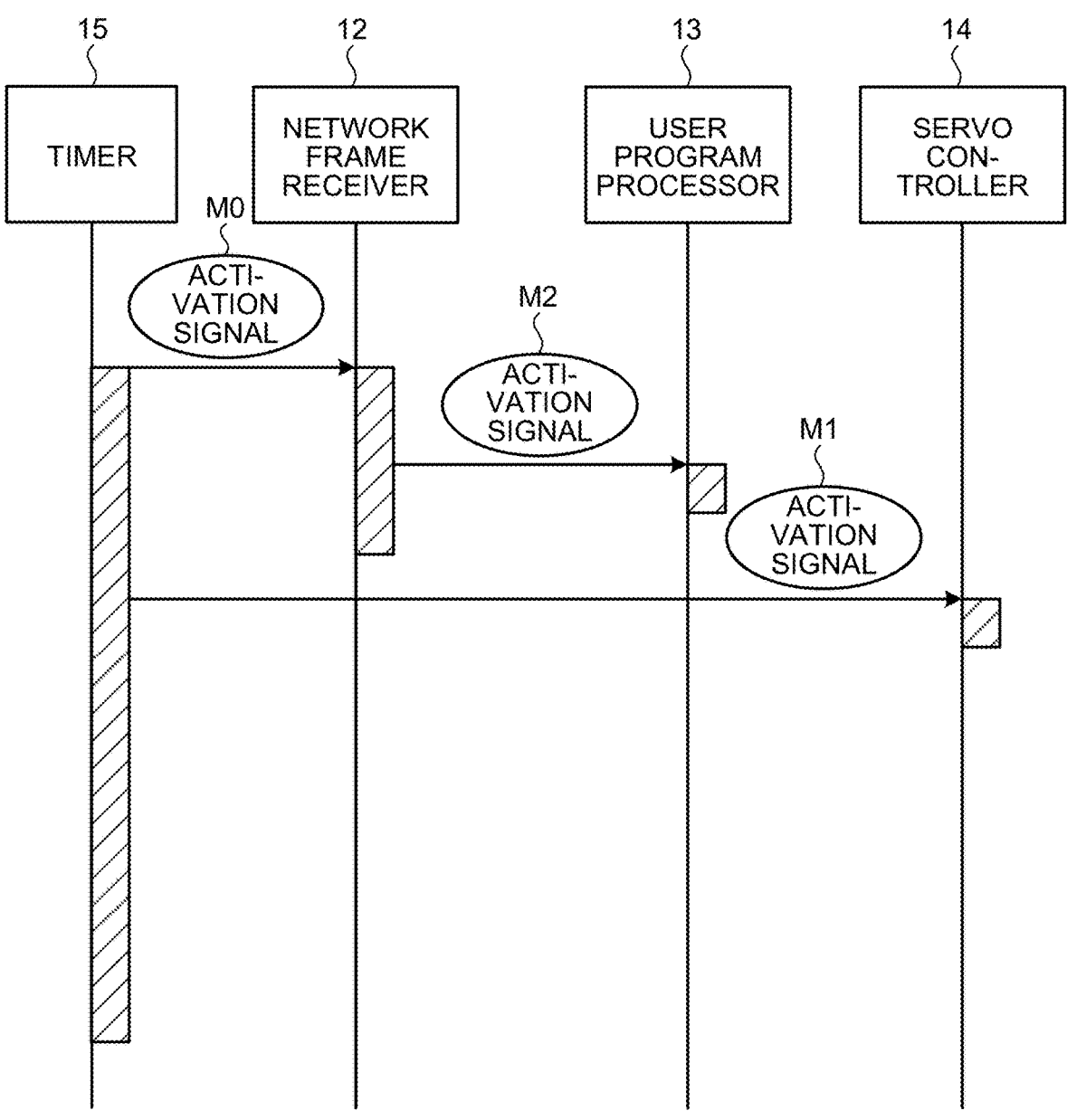
FIG. 2 is a diagram for describing a process of transferring activation signals through function calls, performed by the motor driver according to the embodiment.

FIG. 2 is a diagram for describing a process of transferring activation signals through function calls, performed by the motor driver according to the embodiment. First, the timer 15 calls the network frame receiver 12 by a function call using the activation signal M0. This causes the network frame receiver 12 to perform processing.

Next, the network frame receiver 12 calls the user program processor 13 by a function call using the activation signal M2. This causes the user program processor 13 to execute the user program.

Then, the timer 15 calls the servo controller 14 by a function call using the activation signal M1. This causes the servo controller 14 to perform processing.

Figure 3:
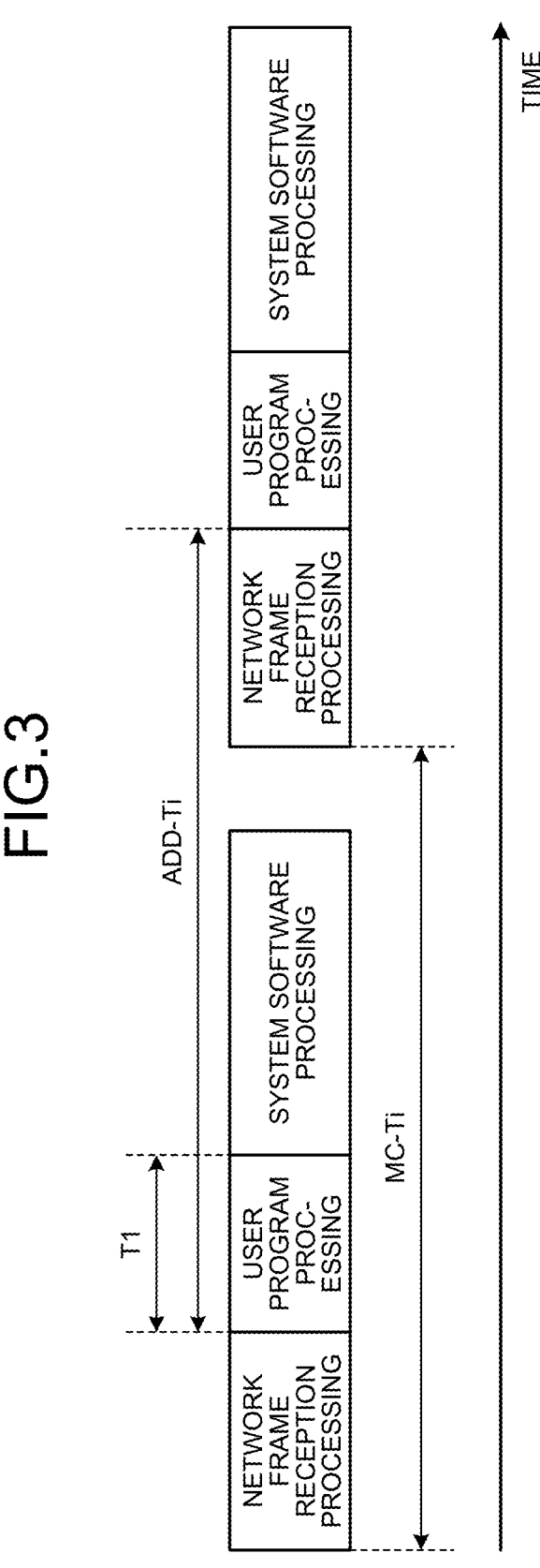
FIG. 3 is a timing chart illustrating process timing of each processing performed by the motor driver according to the embodiment.

FIG. 3 is a timing chart illustrating process timing of each processing performed by the motor driver according to the embodiment. Network frame reception processing illustrated in FIG. 3 corresponds to processing of reception of the control command C2 performed by the network frame receiver 12 of FIG. 1. User program processing illustrated in FIG. 3 corresponds to processing of execution of the user program performed by the user program processor 13 of FIG. 1. System software processing illustrated in FIG. 3 corresponds to servo control processing performed by the servo controller 14.

The network frame receiver 12 performs the network frame reception processing (processing of reception of the control command C2) every network frame reception execution period NT-Ti. Then, the user program processor 13 performs the user program processing. FIG. 3 illustrates a case where the user program processing requires a processing time T1. The user program processor 13 performs the user program processing every user program processing period ADD-Ti. After the user program processing is performed, the servo controller 14 performs the servo control processing.

The user program processor 13 performs the user program processing, and the system software processing while preventing a conflict between N-th system software processing (where N is a natural number) associated with N-th network frame reception processing and (N+1)-th network frame reception processing.

When the user program processor 13 is in operation of performing the user program processing every user program processing period ADD-Ti and fails to perform the user program processing every user program processing period ADD-Ti, the user program processor 13 determines that an unusual state has occurred. In this case, the user program processor 13 aborts the user program processing, and outputs an alarm indicating a system error. Thus, after detection of an unusual processing time of the user program processing, the user program processor 13 invalidates the user program processing to prevent execution of the user program in next periodic processing of performing the user program.

Examples of the method for use by the user program processor 13 to monitor for an unusual state of the user program include the following methods. A first monitoring method is to monitor processing of the entire servo drive system 1 on the basis of the user program processing period ADD-Ti. A second monitoring method is to monitor only the user program processing on the basis of an internal time of the motor driver 10.

For example, in the first monitoring method, the user program processor 13 starts the user program processing to be performed by the user program processor 13, at time t1, and starts the user program processing to be performed by the user program processor 13, at time t2, which is a time when the user program processing period ADD-Ti has elapsed since time t1. Time t2 is a time of reception of a first activation signal among activation signals M2. Time t1 is a time of reception of a second activation signal among activation signals M2. The second activation signal is the activation signal immediately previous to the first activation signal.

The user program processor 13 determines whether the user program processing started at time t1 has been completed at time t2. That is, when an activation signal M2 is received, the user program processor 13 determines whether the user program processing corresponding to the immediately previous activation signal M2 has been completed. Specifically, when the immediately previous user program processing has not been completed at the time when the user program processor 13 receives an activation signal M2, the user program processor 13 can determine that an unusual condition has occurred.

Upon detection that the user program processing started at time t1 has not been completed at time t2, the user program processor 13 determines that an unusual state has occurred, aborts the user program processing, outputs an alarm indicating a system error, and causes stopping of driving the motor 30. Note that when the user program processor 13 determines that an unusual state has occurred and aborts the user program processing, the user program processor 13 may abort starting of the program processing of the user program started on the basis of the first activation signal, or may abort the program processing of the user program started on the basis of the first activation signal. That is, when determining that an unusual state has occurred and aborting the user program processing, the user program processor 13 aborts performing the program processing that has been started on the basis of the first activation signal. Alternatively, when determining that an unusual state has occurred and aborting the user program processing, the user program processor 13 may abort performing program processing of the user program that has been started each based on the first activation signal and on the second activation signal.

In addition, in the second monitoring method, the user program processor 13 obtains an internal timer value each at start (startup) and completion of the user program processing when the user program processor 13 performs a single execution of user program processing. The user program processor 13 calculates a processing time of a single execution of the user program based on a difference between an internal timer value at start and an internal timer value at completion, and determines that an unusual state has occurred when the processing time of a single execution of the user program reaches or exceeds a predetermined time. That is, when the user program processing started on the basis of an activation signal M2 has not been completed within a predetermined time, the user program processor 13 determines that an unusual condition has occurred. When the user program processor 13 determines that an unusual state has occurred, the user program processor 13 aborts the user program processing, outputs an alarm indicating a system error, and causes stopping of driving the motor 30.

Figure 4:
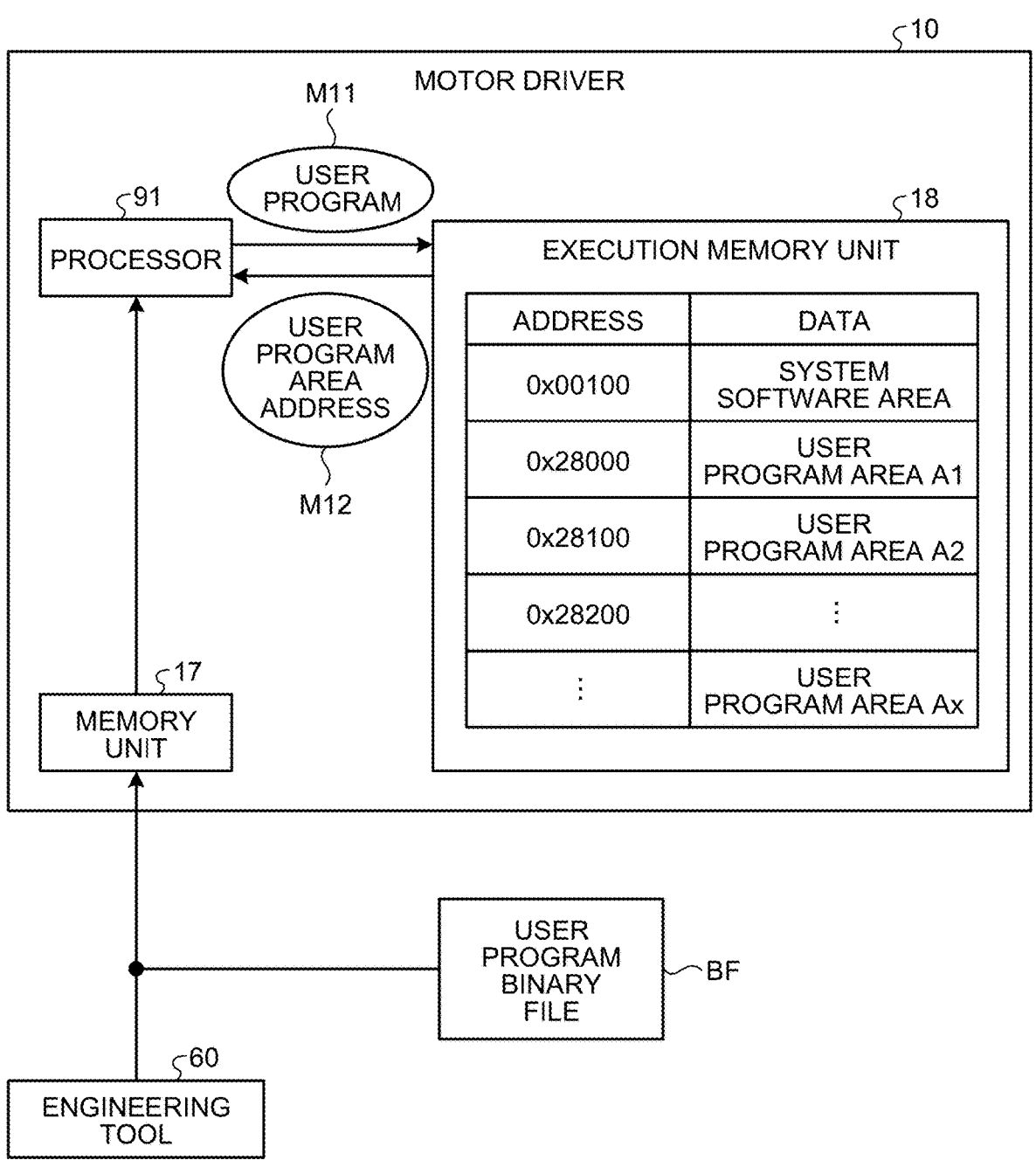
FIG. 4 is a diagram for describing a user program used by the motor driver according to the embodiment.

FIG. 4 is a diagram for describing a user program used by the motor driver according to the embodiment. FIG. 4 illustrates an example internal configuration of the execution memory unit 18 storing a user program M11. Note that FIG. 4 only illustrates the processor 91, the memory unit 17, and the execution memory unit 18 among the components included in the motor driver 10.

The user program processor 13 included in the processor 91 executes the user program M11 corresponding to a user program binary file BF, which is generated by the user.

The user program binary file BF is stored in the memory unit 17 of the motor driver 10. The user program binary file BF is stored in the memory unit 17 in such a manner that, for example, an engineering tool 60 writes the user program binary file BF into the motor driver 10.

Note that the user program binary file BF may be stored in the memory unit 17 via a network or via the higher-level controller 20. That is, the user program binary file BF may be stored in the memory unit 17 by any method.

The processor 91 reads the user program binary file BF written in the memory unit 17 upon startup of the motor driver 10, and copies the user program binary file BF as the user program M11 to user program areas A1 to Ax (where x is a natural number) of the execution memory unit 18, in which the system software of the motor driver 10 is stored. Thus, correspondence relationships each between an address and a block of data of the user program M11 are stored in the execution memory unit 18. Data associated with addresses are stored in the execution memory unit 18 in a system software area and in the user program areas A1 to Ax.

The processor 91 stores a user program area address M12, which is the address of each of the user program areas A1 to Ax, upon startup of the motor driver 10. This enables the processor 91 to call and execute a program stored in the corresponding one of the user program areas A1 to Ax associated with the user program area address M12 that has been stored, during execution of the system software of the motor driver 10.

Figure 5:
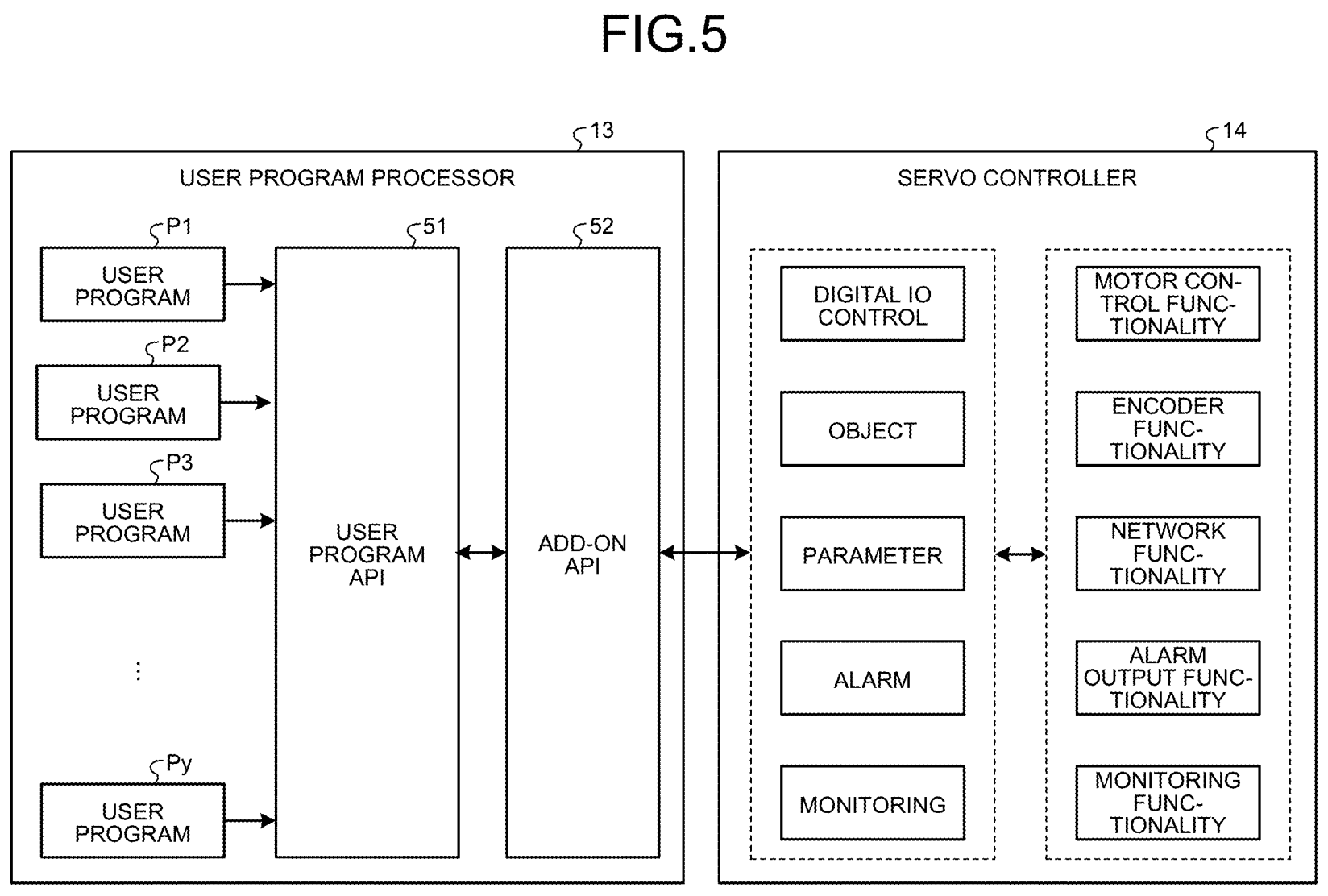

FIG. 5 is a diagram for describing functional configurations of the user program processor and of the servo controller included in the motor driver according to the embodiment. The user program processor 13 receives user programs P1 to Py (where y is a natural number), and includes a user program application programming interface (API) 51 and an add-on API 52. The user program API 51 is an interface for providing connection to internal processing of the motor driver 10 in the user programs P1 to Py. The user programs P1 to Py are programs included in the user program M11 described above.

The user generates the user program binary file BF using a program generation device (not illustrated). In this process, the user generates the user program binary file BF using the user program API 51.

In generation of the user program binary file BF of the user programs P1 to Py, the user uses the user program API 51 to set the user program processing period ADD-Ti based on the network communication period MC-Ti to each of the user programs P1 to Py.

The user program API 51 is an interface that enables registration, and disabling and enabling a process interrupt, of the user programs P1 to Py, reception and overwrite of the control command C2 sent from the higher-level controller 20, and the like.

The user program API 51 allows new generation of data of user-specific digital input output (IO) control, an object for exchanging data with the higher-level controller 20, a parameter, an alarm, and monitoring to be set during servo control, and the like.

This enables the user to generate the foregoing data of digital IO control, an object, a parameter, an alarm, monitoring, and the like in the user programs P1 to Py in a user-specific manner by using the user program API 51, thereby enabling customization of the control command C2 and the like.

The user programs P1 to Py including the data of digital IO control, an object, a parameter, an alarm, monitoring, and the like are transferred to the add-on API 52 via the user program API 51 of the user program processor 13, and are transferred to the servo controller 14 via the add-on API 52. The add-on API 52 is an interface for transferring customized command values that have been set by the user programs P1 to Py to the servo controller 14. Assignment of a customized command value to the data of digital IO control, an object, a parameter, an alarm, monitoring, and the like provides customization of the data of digital IO control, an object, a parameter, an alarm, monitoring, and the like. The add-on API 52 also functions as an interface that when the command value has been customized, receives data and a value from the servo controller 14, where the data is obtained by, and the value has been set through, performing processing relating to control of the motor 30 by the servo controller 14 using digital IO control, an object, a parameter, an alarm, monitoring, and the like based on the customized command value (output control command M5), and when the command value has not been customized, receives data and a value from the servo controller 14, where the data is obtained by, and the value has been set through, performing processing relating to control of the motor 30 by the servo controller 14 using digital IO control, an object, a parameter, an alarm, monitoring, and the like based on the command value (control command M3). In addition, the add-on API 52 transfers the data and the setting value or values received from the servo controller 14, to the user program API 51.

By receiving data and a setting value from the add-on API 52, the user program API 51 can verify data obtained by, and a value that has been set to the servo controller 14 through, performing processing in the servo controller 14 relating to control of the motor 30 using digital IO control, an object, a parameter, an alarm, monitoring, and the like, and then generate the user program binary file BF.

The processor 91 reads the user programs P1 to Py upon startup of the motor driver 10, thereby enabling the system software to call the user programs P1 to Py with a period of the user program processing period ADD-Ti.

The servo controller 14 has motor control functionality to control the motor 30, and encoder functionality to perform feedback control using the operation detection value D1 received from the detector 40. The servo controller 14 also has functionalities such as network functionality to communicate with the higher-level controller 20 via the network frame receiver 12, alarm output functionality to output an alarm, and monitoring functionality to monitor the control command M3, the input control command M4, the output control command M5, and the like. The servo controller 14 performs processing relating to control of the motor 30 using these functionalities and using the digital IO control, an object, a parameter, an alarm, monitoring, and the like that has been set by the user programs P1 to Py. The servo controller 14 sends, to the add-on API 52, the data obtained by, and the value that has been set through, performing processing relating to control of the motor 30 using the digital IO control, an object, a parameter, an alarm, monitoring, and the like. That is, the servo controller 14 sends, to the add-on API 52, a value representing an On or Off state of a device performing digital IO control, a setting value of a parameter, a value of an object that is data obtained by the servo controller 14 (e.g., a control command, an operation detection value, etc.), a value indicating whether an alarm has occurred, and a value obtained by monitoring performed by the monitoring functionality (e.g., a control command, information from a detector, etc.).

An example operation of the user program M11 executed by the user program processor 13 will next be described. A case is herein described in which the user program processor 13 executes the user program M11 to thereby convert a sequential position command sent from the higher-level controller 20 into a position command when an electronic cam is used, and outputs the position command to the servo controller 14. That is, in the following description, the input control command M4 represents the sequential position command sent from the higher-level controller 20, and the output control command M5 represents the position command when an electronic cam is used.

The electronic cam is a cam having a software mechanism instead of a mechanical mechanism of performing synchronized control actually using a cam. When an electronic cam is used, the user program processor 13 calculates an amount of movement provided through the cam when the cam is controlled by a sequential position command. This enables the program processor 13 to perform control similar to control provided by a real cam.

Note that the present embodiment is described using an example in which the user program processor 13 provides a cam operation through the user program M11. However, the user program processor 13 may perform any processing through the user program M11.

Figure 6:
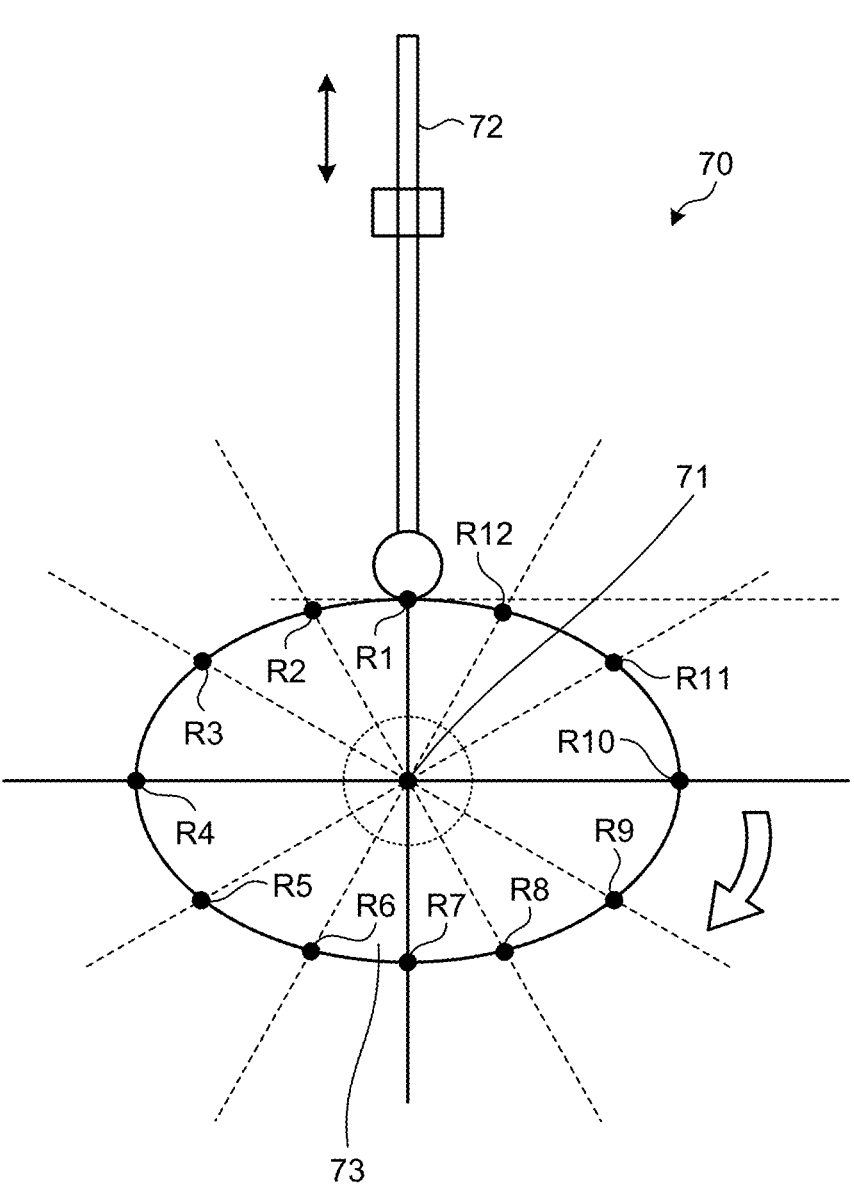
FIG. 6 is a diagram for describing a configuration of an electronic cam used by the motor driver according to the embodiment.

FIG. 6 is a diagram for describing a configuration of an electronic cam used by the motor driver according to the embodiment. The electronic cam 70 includes an input shaft 71, an output shaft 72, and a plate cam 73 having, for example, an ellipse shape.

The sequential position command sent from the higher-level controller 20 is a command to rotate the input shaft 71. Upon reception of a sequential position command (the input control command M4) to rotate the input shaft 71, the user program processor 13 calculates an amount of movement of the output shaft 72 when the plate cam 73 provides a movement corresponding to this sequential position command. The user program processor 13 calculates an amount of movement of the output shaft 72 using the user program M11.

When the sequential position command to rotate the input shaft 71 is a command to rotate the input shaft 71 clockwise equiangularly (30 degrees in FIG. 6) each time, the plate cam 73 rotates clockwise equiangularly. This causes the output shaft 72 in contact with an outer circumferential portion of the plate cam 73 to move to a position corresponding to the shape and to the rotational movement of the plate cam 73. The output shaft 72 in this example is in contact with the outer circumference of the plate cam 73 in order of an outer circumferential position R1 of the plate cam 73, which is the start point, an outer circumferential position R2, an outer circumferential position R3, an outer circumferential position R4, . . . , and an outer circumferential position R12 of the plate cam 73 as the plate cam 73 rotates. This causes the output shaft 72 to move in reciprocation vertically.

Figure 7:
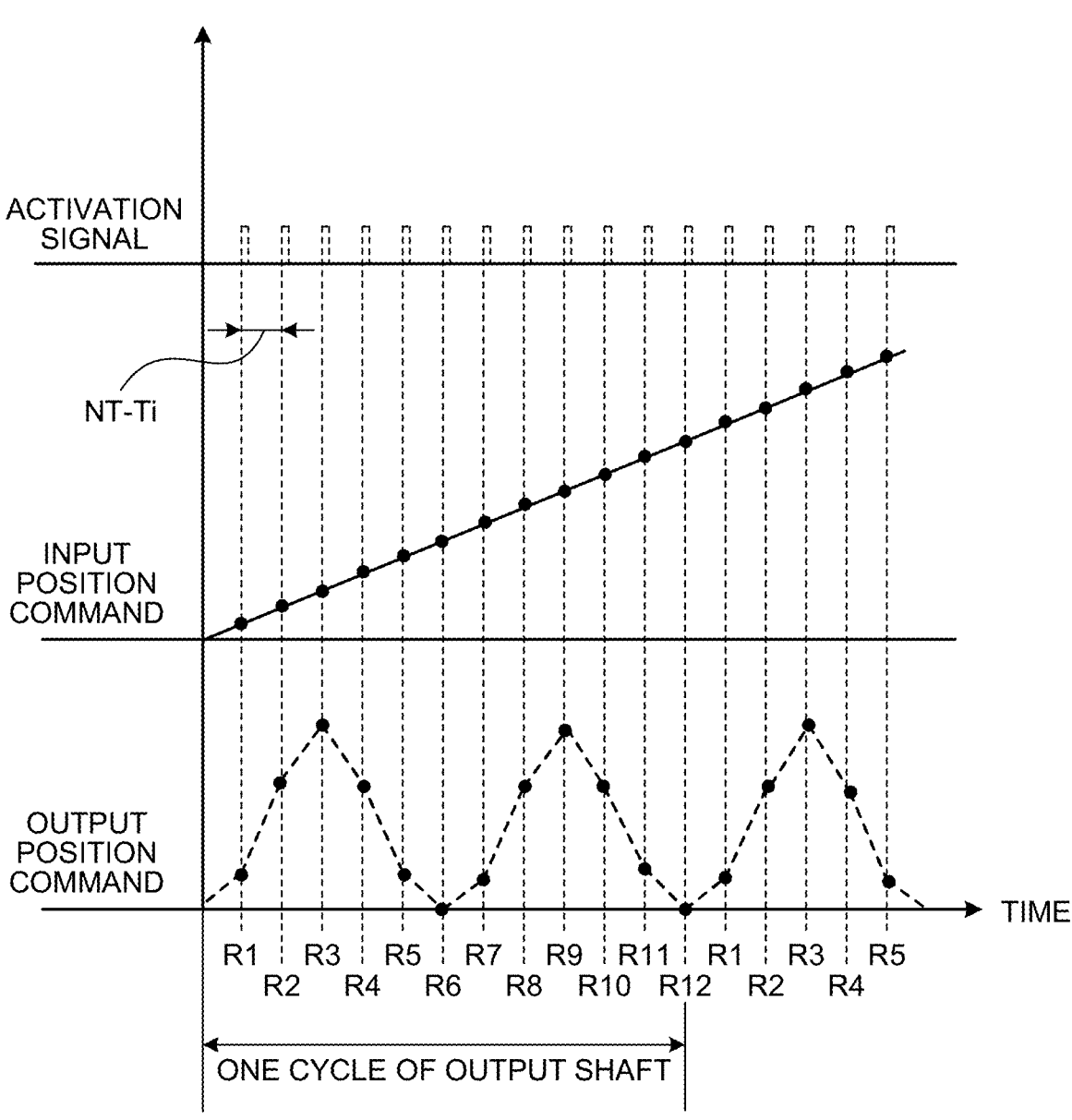
FIG. 7 is a diagram for describing an output position command calculated by the user program processor of the motor driver according to the embodiment.

The output position command calculated by the user program processor 13 will next be described. FIG. 7 is a diagram for describing the output position command calculated by the user program processor of the motor driver according to the embodiment. FIG. 7 illustrates an example of timing chart of the input position command to the user program processor 13 and the output position command calculated by the user program processor 13.

The network frame receiver 12 receives the input position command illustrated in FIG. 7 from the higher-level controller 20 as the control command C2 every network frame reception execution period NT-Ti. The input position command illustrated in FIG. 7 is a sequential position command causing the commanded position to be accumulated until the target position is reached.

The following description will be provided with respect to processing performed by the network frame receiver 12 when, for example, the user program processing period ADD-Ti is set to a period the same as the network communication period MC-Ti. In this case, the network frame receiver 12 performs user program processing with a period the same as, and in synchronization with, timing of reception of the sequential position command from the higher-level controller 20. Note that when the network communication period MC-Ti is Z times the user program processing period ADD-Ti, the network frame receiver 12 performs user program processing such that the network communication period MC-Ti and a period that is Z times the user program processing period ADD-Ti will be a same period.

Upon reception of the control command C2 from the higher-level controller 20, the network frame receiver 12 starts the user program processor 13 using the activation signal M2. In addition, the network frame receiver 12 sends the input control command M4, corresponding to the input position command illustrated in FIG. 7, to the user program processor 13.

A cam pattern conversion process generated by the user is implemented in the user program M11. In the cam pattern conversion process, the user program processor 13 generates the output position command of FIG. 7 (the output control command M5) to cause the movement of the output shaft 72 to be provided based on the input position command of FIG. 6 (the input control command M4) for the input shaft 71. The cycle from the outer circumferential position R1 to the next outer circumferential position R1 of the output position command of FIG. 7 is one cycle of the output shaft 72.

The user program processor 13 outputs the output position command generated, to the servo controller 14 as the output control command M5. This causes the servo controller 14 to control the motor 30 based on the output control command M5 received.

As described above, this enables the motor driver 10 to process the control command C2 from the higher-level controller 20 at high speed without modification of processing of the system software. In addition, operation of the user program M11 to be used by the motor driver 10 can be written by the user, thereby enabling the user to flexibly modify the operation of the servo drive system 1.

Moreover, the motor driver 10 generates the activation signal M2 corresponding to timing of reception of the control command C2, and performs user program processing on the basis of the activation signal M2. This eliminates a need for the higher-level controller 20 to generate a signal dedicated to synchronization for synchronizing the user program M11 with the control command C2.

Furthermore, the motor driver 10 performs user program processing in synchronization with the network communication period MC-Ti of communication with the higher-level controller 20, and can thus process at high speed the control command C2, such as a sequential position command, from the higher-level controller 20. This enables the motor driver 10 to customize at high speed a position control command, a speed control command, and a torque control command sent from the higher-level controller 20, and also to precisely control the position, the speed, and the torque.

In the embodiment, as described above, the user program processor 13 starts the user program M11 according to the activation signal M2 generated at each reception of the control command C2 when the motor driver 10 performs program processing of the user program M11. Accordingly, the user program processor 13 causes the user program M11 to perform program processing on the input control command M4 associated with the control command C2, in synchronization with timing of reception of the control command C2 with the network frame reception execution period NT-Ti. The servo controller 14 then outputs a servo control command on the basis of the output control command M5 resulting from the program processing.

This enables the motor driver 10 to perform program processing of the user program M11 in synchronization with the control command C2 sent from the higher-level controller 20. This then enables the motor driver 10 to customize the control command C2 sent from the higher-level controller 20 at high speed to control the motor 30.

The configurations described in the foregoing embodiment are merely examples. These configurations may be combined with another known technology, and moreover, part of such configurations may be omitted and/or modified without departing from the spirit thereof.

REFERENCE SIGNS LIST 1 servo drive system; 10 motor driver; 12 network frame receiver; 13 user program processor; 14 servo controller; 15 timer; 16 drive controller; 17 memory unit; 18 execution memory unit; 20 higher-level controller; 30 motor; 40 detector; 50 load; 51 user program API; 52 add-on API; 60 engineering tool; 70 electronic cam; 71 input shaft; 72 output shaft; 73 plate cam; 91 processor; 92 memory; A1 to Ax user program area; ADD-Ti user program processing period; BF user program binary file; C1, M0, M1, M2 activation signal; C2, M3 control command; M4 input control command; M5 output control command; M11 user program; M12 user program area address; MC-Ti network communication period; MCN-Ti activation period; NT-Ti network frame reception execution period; SV-Ti servo control period; P1 to Py user program; R1 to R12 outer circumferential position; T1 processing time; Ti period.

The invention claimed is:

1. A motor driver configured to supply electrical power to a motor on a basis of a control command sent periodically at a rate according to a network communication period of the communication network and sent from a higher-level controller connected to the motor driver via the communication network, the motor driver comprising:

a network frame receiver configured to receive the control command via the communication network at the periodical rate;

a user program processor configured to perform program processing of a user program created by a user;

a servo controller configured to output a servo control command, the servo control command being based on the control command; and a drive controller configured to supply electrical power to the motor, the electrical power being based on the servo control command, wherein when the user program processor performs the program processing:

the user program processor is configured to start the user program according to each of activation signals generated at respective receptions of the control command to cause the user program to perform program processing on the control command to convert the control command into a command corresponding to the user program, in synchronization with the network communication period of the control command when the network frame receiver receives the control command; and the servo controller is configured to output the servo control command, the servo control command being based on the control command resulting from the program processing.

2. The motor driver according to claim 1, wherein the control command includes a sequential position command, a sequential speed command, or a sequential torque command, directed to the motor.

3. The motor driver according to claim 1, wherein when the program processing started on a basis of one of the activation signals has not been completed within a predetermined time, the user program processor determines that an unusual condition has occurred, and aborts the program processing associated with the one of the activation signals.

4. The motor driver according to claim 1, wherein when the program processing started on a basis of a second activation signal of the activation signals has not been completed at a time when the user program processor receives a first activation signal of the activation signals, the user program processor determines that an unusual condition has occurred, and aborts performing the program processing started on a basis of the first activation signal, the second activation signal being an activation signal immediately previous to the first activation signal.

5. The motor driver according to claim 1, wherein the network frame receiver is configured to receive the control command in every network communication period.

6. The motor driver according to claim 1, wherein the user program processor is configured to perform the user program with a period the same as the network communication period.

7. The motor driver according to claim 1, wherein the user program processor is configured to perform the user program with a period that is a constant-value times the network communication period.

8. The motor driver according to claim 1, wherein the user program processor is further configured to determine whether the user program has completed processing at a time synchronized with the network communication period.

9. The motor driver according to claim 1, wherein the user program is executed during the network communication period.

10. A servo drive system comprising:
the motor driver according to claim 1; and
the higher-level controller.

11. A servo drive system comprising:
the motor driver according to claim 2; and
the higher-level controller.

12. A servo drive system comprising:
the motor driver according to claim 4; and
the higher-level controller.

13. A servo drive system comprising:
the motor driver according to claim 3; and
the higher-level controller.

* * * * *